United States Patent [11] 3,586,046

| [72] | Inventor | Roscoe R. Alford<br>Bartlesville, Okla. |
|---|---|---|
| [21] | Appl. No. | 820,930 |
| [22] | Filed | May 1, 1969 |
| [45] | Patented | June 22, 1971 |
| [73] | Assignee | Phillips Petroleum Company |

[54] CARBON BLACK RECOVERY APPARATUS
7 Claims, 6 Drawing Figs.

[52] U.S. Cl. .................................................. 137/608,
137/609
[51] Int. Cl. ...................................................... F17d 1/00,
F16k 11/14
[50] Field of Search ........................................ 137/608,
609, 614.11, 614.18, 637.5, 610

[56] References Cited
UNITED STATES PATENTS
| 570,833 | 11/1896 | Williams .................... | 137/608 |
|---|---|---|---|
| 1,811,422 | 6/1931 | Brown ......................... | 137/608 X |
| 1,851,034 | 3/1932 | Blatter ......................... | 137/610 |
| 2,507,467 | 5/1950 | Fredrickson et al. ........ | 137/611 X |
| 2,306,069 | 12/1942 | Loxterman .................. | 137/608 |
| 2,676,602 | 4/1954 | Fox ............................. | 137/815 UX |
| 3,039,490 | 6/1962 | Carlson, Jr. ................. | 137/81.5 X |
| 3,190,584 | 6/1965 | Gure et al. .................. | 137/609 X |
| 3,238,971 | 3/1966 | Cerone ........................ | 137/614.11 |
| 3,448,770 | 6/1969 | Edgemond, Jr. et al. ..... | 137/610 |
| 3,476,150 | 11/1969 | Loewenthal ................ | 137/608 X |

*Primary Examiner*—Samuel Scott
*Attorney*—Young and Quigg

ABSTRACT: Carbon black ductwork between the reactor and the recovery facilities is disclosed. The ductwork is comprised of a plurality of separate passageways of different areas, and means are supplied to select certain flow areas in order to maintain smoke velocities at values sufficient to prevent carbon black from settling out of the smoke.

PATENTED JUN22 1971   3,586,046
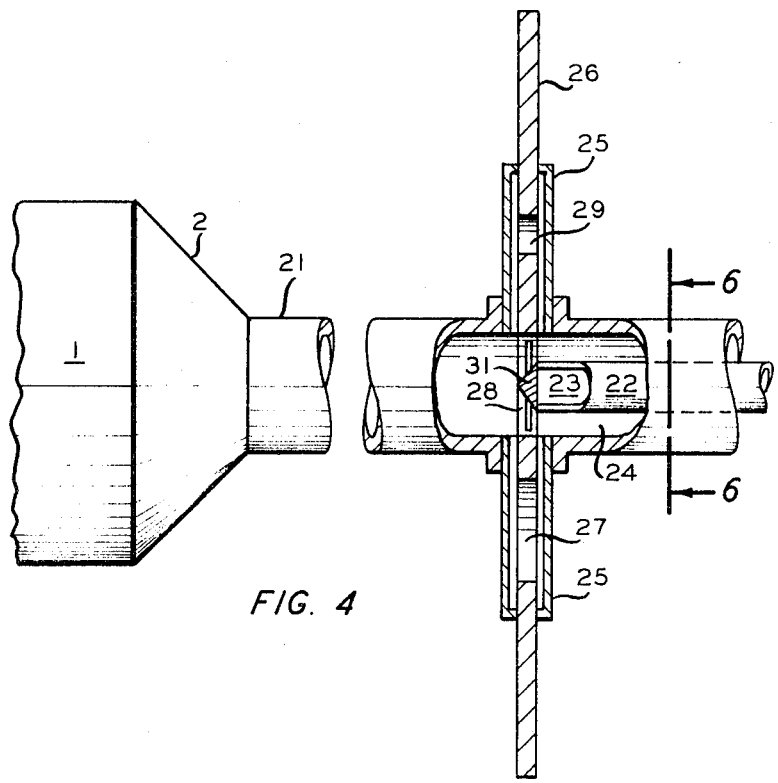
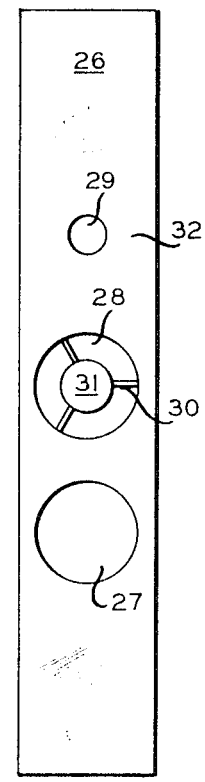
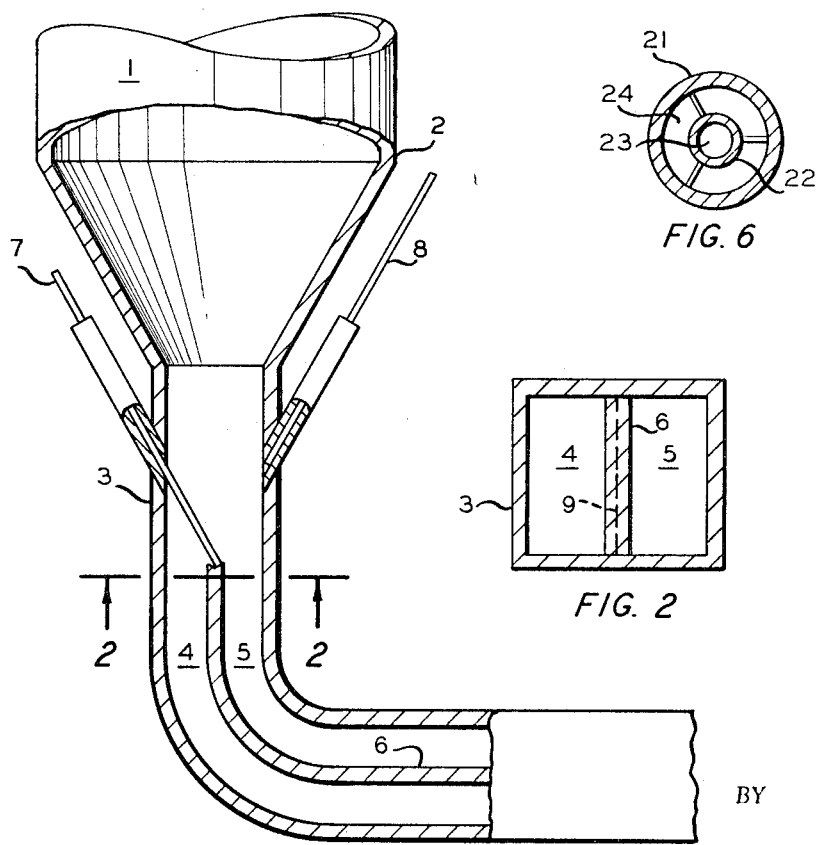
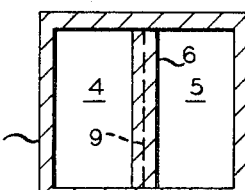
INVENTOR.
R. R. ALFORD
BY
Young & Quigg
ATTORNEYS

CARBON BLACK RECOVERY APPARATUS

This invention relates to flow conducting means.

In one of its more specific aspects, this invention relates to apparatus facilitating the flow of carbon black in the smoke in which it is produced.

In carbon black manufacture, a single reactor is frequently employed to produce a wide variety of blacks, these blacks being produced over a wide range of rates. Inasmuch as particle sizes and densities of the various carbon blacks differ, difficulties are frequently encountered in conveying the various carbon black smokes from the reactor to the subsequent recovery facilities due to the settling of the carbon black from the smoke in that conduit between the reactor and the recovery system. Such settling increases the pressure drop within the system and the back pressure on the reactor, with the result that carbon black quality is affected. Such problems are particularly pertinent in the production of large particle blacks at low production rates when the quantity of smoke produced may be too low to maintain the carbon black in suspension.

The apparatus of this invention is directed towards the solution of this problem. According to this invention there is provided ductwork for conducting the smoke from a carbon black reactor to carbon black recovery facilities, the ductwork being comprised of a plurality of flow passageways with means being provided for selecting the passageway through which the smoke is conducted.

Accordingly, it is an object of this invention to provide a ductwork suitable for variable carbon black production rates.

It is another object of this invention to provide a ductwork in which carbon black deposition is minimized.

In one embodiment of this invention, the ductwork includes a plurality of valves slideably adjustable to effect flow through one passageway of a multipassageway duct, the passageways being of substantially equal areas.

In another of its embodiments, this invention involves a single valve, slideably adjustable within the ductwork, to effect flow through at least one passageway of a multipassageway duct, the passageways being of different areas.

The apparatus of this invention will be more easily understood when explained in conjunction with the following drawings representing certain embodiments of this invention in which:

FIG. 1 is an elevation of a view of one embodiment of the invention;

FIG. 2 is a cross-sectional view taken along section 2–2 of FIG. 1;

FIG. 3 is a detailed view of one aspect of the apparatus shown in FIG. 1;

FIG. 4 is a plan view of the second embodiment of the invention;

FIG. 5 is a detailed view of one aspect of the apparatus shown in FIG. 4; and

FIG. 6 is a cross-sectional view taken along section 6–6 of FIG. 4.

Referring now to Figure 1, there is shown schematically the downstream outlet portion 2 of reactor 1, reactor 1 being a conventional vertically positioned furnace carbon black reactor. At its downstream end, reactor 2 joins conduit 3 which conducts the smoke to the carbon black recovery facilities.

Conduit 3 is divided into flow areas or passages 4 and 5 by division plate 6 extending diametrically between the internal walls of conduit 3.

Entering conduit 3 upstream of the upstream end of plate 6 are slide plates 7 and 8 which are slideably positionable for extension into conduit 3. As shown in FIG. 2, conduit 3, where slide plates 7 and 8 enter it, is preferably of rectangular configuration to conform to the rectangularity of slide plates 7 and 8. However, conduit 3 can be of a circular configuration with rectangular appendages, not shown, being affixed to the conduit to permit the more efficient positioning of plates 7 and 8. Plates 7 and 8 are preferably adapted with leakproof seals at those points at which they enter conduit 3, the use of such seals being within the skill of the art.

Plates 7 and 8 are individually or jointly operable to effect individual closure of flow areas 4 and 5. At high production rates, plates 7 and 8 are in their retracted positions which permits the desired velocities through both flow areas 4 and 5. At intermediate flow rates, one or the other of plates 7 and 8 may be placed in the closed position, that is, in a position where that end projecting into conduit 3 abuts the upstream end of plate 6, thus substantially sealing off one or the other of flow areas 4 and 5 to produce a suitable velocity through that flow area remaining open.

While it is not necessary to obtain a leakproof sealing of plates 7 or 8 against plate 6, inasmuch as the obstruction provided by plates 7 and 8 will serve to divert the greater flow into the unclosed flow area, under the low operating pressures involved, the upstream end of plate 6 can be adequately adapted for sealing against plates 7 or 8 if notched as shown in FIG. 3, plate 7 being shown therein as seated within notch 9, notch 9 extending the full diametric length of plate 6. It is seen that notch 9 is similarly adapted to accept plate 8 when plate 7 is withdrawn.

While the embodiment depicted in FIGS. 1 through 3 is particularly suitable for employment in a vertical reactor in which plates 7 and 8 are preferably positioned at an angle from the horizontal such as to prevent accumulation of carbon black thereon, this embodiment is equally suitable for installation in horizontally positioned reactors with horizontally disposed conduits interconnecting the reactor and the recovery facilities.

Referring now to FIGS. 4, 5 and 6, there is shown another embodiment of this invention. Conduit 21 interconnects reactor 1 with flow recovery facilities, now shown. Conduit 21 has conduit 22 centrally disposed therein, conduit 22 being supported internally within conduit 21 in any suitable manner. Hence, there is formed flow area 23 within conduit 22 and flow area 24 annular to conduit 22, the flow areas being concentric. Depending upon the size of conduit 22, any relationship can be established between flow areas 23 and 24 in accordance with the flow rates anticipated at the various carbon black production rates.

Intersecting conduit 21 at the upstream end of conduit 22 is plate 26, adapted for slideably positioning in track 25. As shown in FIG. 5, plate 26 is equipped with a series of apertures 27, 28 and 29. When plate 26 is in a first position, aperture 27 coincides with conduit 21 such that both flow areas 23 and 24 are unobstructed and the flow is through both areas. When plate 26 is in the second position, as indicated in FIG. 4, aperture 28 coincides the annulus 24. Plug 31 which is of optional configuration is positioned centrally of aperture 28 by legs 30 which are positioned to obstruct flow through area 23 and diverts flow through annulus flow area 24. When plate 26 is in the third position, aperture 29 coincides with the opening into conduit 23 such that area 32 surrounding aperture 29 obstructs flow through annulus 24, while flow is permitted through area 23. In this manner, plate 26 is adaptable to be positioned to direct flow into any desired combination of flow areas 23 and 24.

As mentioned, a leakproof seal between plate 26 and the conduits concerned is not necessary. However, a practical arrangement of plate 26 in respect to its being positioned against these conduits is such that track 25 in which plate 26 is positioned is of rectangular configuration, in elevation, and closed, in order to minimize leaking of gases from the system.

While the preceding discussion has been in terms of the flow selection means being positioned at the upstream end of the plurality of flow passages, flow selection means can be positioned, either alternately or conjunctively, at the downstream end of the flow passages.

Relatedly, all valve embodiments can be adapted around the edges with tracks which guide and facilitate their movement and minimize leakage. Similarly, it is possible to provide motorized means for positioning the slideable plates, such positioning being automatically performed in response to flow indicating mechanisms which determine that the flow through any one flow area is below the minimum to maintain the carbon black in suspension and hence that the number of flow areas being employed should be reduced.

It will be evident from the above discussion that this apparatus can be employed for conducting numerous suspensions of solids in gases and that many embodiments are possible; for example, a plurality of flow areas greater than two in number can be employed with any combination of flow areas being eliminated by positioning of a slideable plate. However, these and other such modifications are considered as being within the skill of the art in light of the above discussion.

What I claim is:

1. A carbon black ductwork which comprises:
 a. an outer conduit;
 b. an inner conduit positioned within said outer conduit and in spaced relationship thereto to form an annulus therebetween, said outer conduit extending beyond the terminus of said inner conduit;
 b. a guide track positioned proximate the terminus of said inner conduit and in diametric and intersecting relationship to said outer conduit; and,
 d. a plate penetrated by a plurality of apertures and slideably positionable within said track, the apertures of said plate being in spaced relationship along said plate, said plate being alternately positionable within said track in obstructing relationship to flow through said inner conduit and through said annulus.

2. The ductwork defined in claim 1 in which said inner conduit is centrally positioned within said outer conduit.

3. The ductwork defined in claim 1 in which said plate has three apertures therethrough.

4. The ductwork as defined in claim 3 in which a first aperture has an area substantially equal to the inner area of said inner conduit and in which a second aperture has an area substantially equal to the inner area of said outer conduit and in which a third aperture has an obstruction positioned in spaced relationship to the periphery of said third aperture to form a passageway between said obstruction and the walls of said aperture, the area of said passageway being substantially equal to the area of said annulus, said passageway being positionable substantially coincidental with said annulus.

5. A carbon black ductwork which comprises:
 a. at least two flow passages enclosed by an outer wall, said flow passages having an inner wall positioned therebetween, said outer wall extending beyond the terminus of said inner wall, said terminus of said inner wall being adapted for the seating of after-defined plates; and,
 b. at least two plates separately and slideably positionable through said outer wall and in seating relationship to the terminus of said inner wall and in closing relationship to flow through said flow passages.

6. The ductwork defined in claim 5 in which said plates are positionable through leakproof seals.

7. The ductwork defined in claim 5 in which said flow passages are of rectangular configuration.